US007715881B1

(12) United States Patent
Liu et al.

(10) Patent No.: US 7,715,881 B1
(45) Date of Patent: May 11, 2010

(54) AUTOMATICALLY INITIATING AND ANSWERING COMMUNICATIONS

(75) Inventors: Jerry Liu, Atlanta, GA (US); Brian Daigle, Marietta, GA (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 822 days.

(21) Appl. No.: 11/275,365

(22) Filed: Dec. 28, 2005

(51) Int. Cl.
*H04B 1/38* (2006.01)
(52) U.S. Cl. .................. 455/564; 466/567; 466/418
(58) Field of Classification Search .............. 455/564, 455/565, 418, 79, 575.1–575.9, 567
See application file for complete search history.

(56) References Cited

U.S. PATENT DOCUMENTS

| 5,550,907 | A  | * | 8/1996  | Carlsen ............... 379/211.02 |
| 6,901,271 | B1 | * | 5/2005  | Cheah et al. ............ 455/564 |
| 7,120,469 | B1 | * | 10/2006 | Urakawa ............... 455/564 |
| 7,149,533 | B2 | * | 12/2006 | Laird et al. ............ 455/550.1 |
| 7,194,256 | B2 | * | 3/2007  | Lee ..................... 455/418 |
| 7,228,145 | B2 | * | 6/2007  | Burritt et al. ............ 455/519 |
| 7,231,229 | B1 | * | 6/2007  | Hawkins et al. .......... 455/564 |
| 7,359,697 | B2 | * | 4/2008  | Toraguchi et al. ........ 455/415 |
| 7,583,972 | B2 | * | 9/2009  | Clipsham ............... 455/418 |
| 2002/0065108 | A1 | * | 5/2002 | Tsukamoto ............. 455/564 |
| 2002/0137470 | A1 | * | 9/2002 | Baron et al. ............ 455/79 |
| 2004/0204122 | A1 | * | 10/2004 | Opela et al. ............ 455/565 |
| 2005/0085257 | A1 | * | 4/2005 | Laird et al. ............ 455/550.1 |
| 2005/0096092 | A1 | * | 5/2005 | Lee .................... 455/564 |
| 2005/0164746 | A1 | * | 7/2005 | Boyd ................... 455/567 |
| 2007/0072647 | A1 | * | 3/2007 | Mousseau et al. ........ 455/564 |
| 2009/0112804 | A1 | * | 4/2009 | Quiroz-Castro ......... 455/575.1 |

* cited by examiner

*Primary Examiner*—Lana N Le
(74) *Attorney, Agent, or Firm*—Cantor Colburn LLP

(57) ABSTRACT

Automatically initiating and answering communications are described herein. A communications device may be configured to automatically initiate outgoing communications to a default destination or to perform some action automatically upon receiving an incoming communication. Entries in a data structure accessible by the communications device can specify different delay periods applicable to each entry, such that communications to or from these entries are handled according to these delay periods. Outgoing communications can be initiated automatically to one of the entries, triggered in response to a user action. The user can override the outgoing communication by acting affirmatively within the delay period specified for the entry to which the communication is being initiated. The communications device can also be configured to automatically answer incoming communications in a variety of ways. The user can act affirmatively within an applicable delay period to override a default answering mode for incoming communications.

10 Claims, 14 Drawing Sheets

| NAME 605 | DESTINATION 610 | ENABLED? 615 | DELAY 620 | SELECTED? 625 |
|---|---|---|---|---|
| JOHN SMITH | 404 555 1212 | YES | 5 SECONDS | NO |
| JANE DOE | JANE@ISP.COM | NO | 3 SECONDS | NO |
| GEORGE BAILEY | GEORGEB | YES | 0 SECONDS | YES |

235(5)

| Name 605 | Auto Answer to Speaker? 1110 | Auto Answer to Headset? 1115 | Auto Answer to Voicemail? 1120 | Delay? 1125 |
|---|---|---|---|---|
| John Smith | Yes | No | No | 5 Seconds |
| Jane Doe | No | Yes | No | 8 Seconds |
| George Bailey | No | No | Yes | 0 Seconds |

Figure 11

AUTOMATICALLY INITIATING AND ANSWERING COMMUNICATIONS

BACKGROUND

Communications devices, such as mobile telephones or other portable wireless communications devices, are increasingly used by a wider group of users. Additionally, communication devices, such as "soft phones" using voice over IP (VoIP) protocols, are increasing being adopted both for business and for personal use.

One factor driving the increased adoption and use of the foregoing communication devices is the need for people to communicate efficiently and quickly with one another. Toward this end, these communications devices can contain address books, contact lists, or the like that may store contact information and other parameters for persons often contacted by a given user of a communications device. To initiate a communication, the user may scroll through the address book to locate the destination of the communication, typically repeating the search of the address book for each outgoing communication. For occasional calls placed to a variety of different persons, the forgoing approach may be suitable. However, where the user wishes to call the same person consistently over some period of time, for example, it may be beneficial to save the user time by avoiding the search of the address book for every outgoing communication.

SUMMARY

Automatically initiating and answering communications are described herein. A communications device may be configured to automatically initiate outgoing communications to a default destination or to perform some action automatically upon receiving an incoming communication. Entries in a data structure accessible by the communications device can specify different delay periods applicable to each entry, such that communications to or from these entries are handled according to these delay periods. Outgoing communications can be initiated automatically to one of the entries, triggered in response to a user action. The user can override the outgoing communication by acting affirmatively within the delay period specified for the entry to which the communication is being initiated. The communications device can also be configured to automatically answer incoming communications in a variety of ways. The user can act affirmatively within an applicable delay period to override a default answering mode for incoming communications.

BRIEF DESCRIPTIONS OF THE DRAWINGS

The teachings herein are described with reference to the accompanying figures. In the figures, the left-most digit(s) of a reference number identifies the figure in which the reference number first appears. The use of the same reference numbers in different figures indicates similar or identical items.

FIGS. 7 and 8 are linked by an off-page reference A.

FIG. 11 is a block diagram illustrating example contents of a data structure, such as the address book, related to automatically answering incoming communications to the device.

FIGS. 12 and 13 are linked by an off-page reference B.

DETAILED DESCRIPTION

Figure 1:
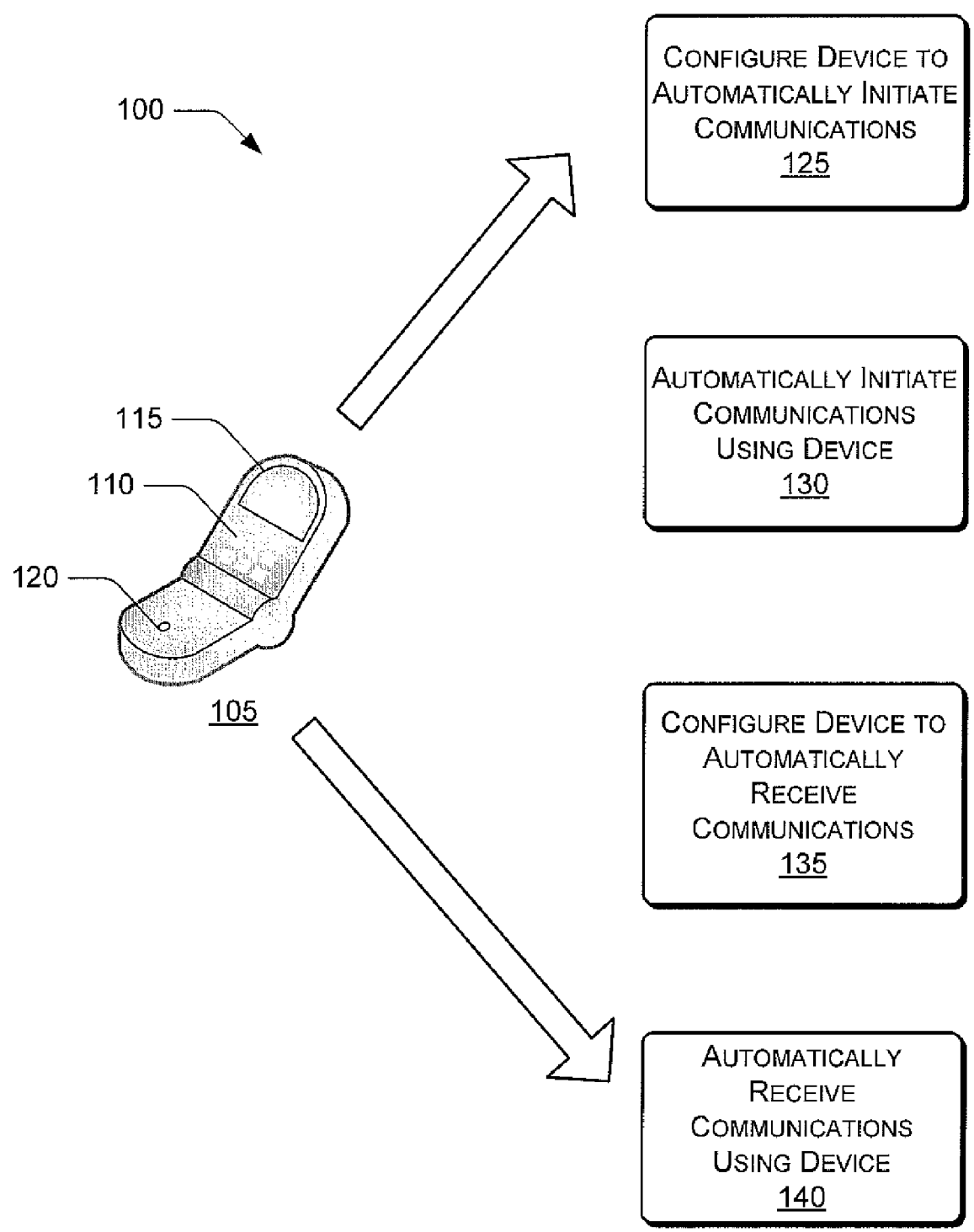
FIG. 1 is a block diagram providing an overview of various functions relating to automatic initiation and answering of communications according to an exemplary embodiment.

FIG. 1 illustrates an architecture 100 for supporting automatic communication using communication devices, such as a mobile communication device 105, according to an exemplary embodiment. The device 105 can be implemented with, for example, a cellular telephone, or other compact portable communication device, such as those described further herein. The device 105 can be implemented as a "soft" phone utilizing, for example, the voice over IP (VoIP) protocol. Employing the device 105, a user can communicate over a wireless and/or wired network with other users. For clarity and conciseness, the users and network are omitted from FIG. 1.

It is noted that while the device 105 is illustrated in the form of a "flip" phone, the subject matter described and claimed herein can be implemented in other types of telecommunications devices. More particularly, the subject matter described and claimed may be implemented in any communication device 105 that includes at least a portion of a housing or other aspect of the device 105 that is operated by the user to access the communication device 105. For example, a user might "flip" open a portion of the device 105 to expose a keypad 110 or a display screen 115, or to speak into a microphone 120. In another example, a user might slide one portion of the device 105 relative to another portion of the device 105 to expose the keypad 110, the display screen 115, and the microphone 120.

Other configurations, in addition to the foregoing non-limiting examples of initiating the automatic communication, are possible as well. For example, some devices 105 may not be equipped with housings that are mechanically actuated in preparation for use. In such instances, these devices 105 may include a key that is marked with a phone receiver icon, with a "1" icon, or with text that is colored green or the like. Pressing this key or an equivalent may also initiate the communication automatically. It is understood that this key may be a "hard" key or a "soft" key. It is also understood that the term "automatic communications" is used herein to refer to communications that are initiated to a destination without a user searching an address book, contact list, or other similar data structure, and without the user providing a destination telephone number or the like at the time that the communication is initiated. Instead, the communication is initiated to a given destination that is predefined at the time that the communication is initiated.

Implementations of the device 105 can support at least one of several different scenarios described herein for performing aspects of automatic communication using mobile communication devices. Block 125 generally represents a scenario in which the device 105 is configured to automatically initiate a communication with a given destination. Block 130 generally represents a scenario in which the device 105 automatically initiates the communication with a given destination, according to the configuration represented generally in block 125. Block 135 generally represents a scenario in which the device 105 is configured to automatically receive a communication that was automatically initiated according to the process represented generally in block 130. Block 140 generally represents a scenario in which the device 105 automatically receives a communication that was automatically initiated according to the process represented generally in block 130. These scenarios 125-140 are discussed in further detail below.

Figure 2:
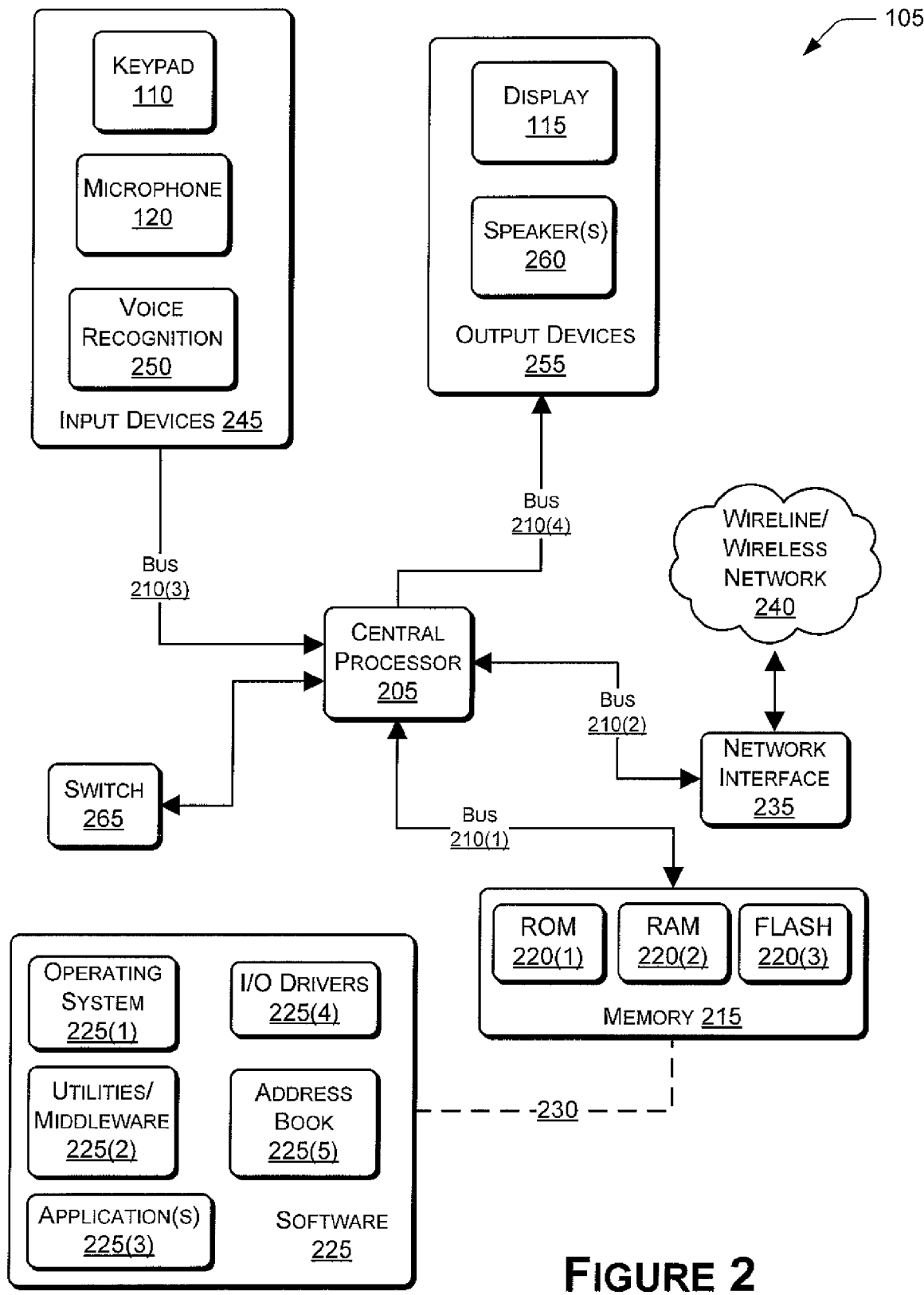
FIG. 2 is a block diagram illustrating an exemplary overall environment for implementing, at least in part, a communications device as shown in FIG. 1.

FIG. 2 illustrates an exemplary overall environment for implementing, at least in part, the communication device 105 as shown in FIG. 1. The communication device 105 may be implemented as a computer-based or processor-based device that includes a central processing unit (CPU) 205. CPU 205 communicates with a variety of components via busses 210(1)-210(4), referenced collectively as busses 210. It is understood that the layout of the busses 210 is shown in FIG. 2 for convenience and clarity of illustration, and implementations of the teachings herein may integrate the respective busses 210(1)-210(4) into a common bus 210.

The CPU 205 can communicate with a memory module 215 via a bus 210(1). The bus 210(1) may be of any data width or any bandwidth as chosen by those skilled in the art for a given implementation. The memory module 215 can include at least read-only memory (ROM) portion 220(1), random-access memory (RAM) portion 220(2), and flash portion 220(3).

Portions of the memory module 215 can store software components 225 during execution, as represented by a line 230. The software components 225 can include at least operating system components 225(1), utility or middleware components 225(2), any I/O device drivers 225(3), and application components 225(4).

Also shown with the software components 225 is an address book 235(5). The address book 235(5) can include entries containing contact information for a plurality of other users and/or devices 105. For example, the address book 235(5) might contain various entries, each having names, telephone numbers, e-mail addresses, or other unique identifiers. The entries within the address book 235(5) may be organized alphabetically, numerically, by order of creation, or in any other convenient fashion. Further details relating to the address book 235(5) are provided below.

The CPU 205 can communicate with a network interface 235 via a bus 210(2). The network interface 235 enables the CPU 205 to communicate with, for example, other communication devices 105 via a network, such as the network 240. The network 240 may include infrastructure and components appropriate to enable users to communicate with one another using wireless communications devices, such as the communication devices 105 described herein. In other implementations, the network interface 235 can enable the CPU 205 to communicate with wireline networks or with partially-wireline networks, and related wired devices. For convenience of illustration, but not limitation, network 240 is shown in FIG. 2 as a wireline/wireless network.

The CPU 205 can receive input from the user via a bus 210(3), which couples the CPU 205 to various input devices 245. The input devices 245 can include the keypad 110 and microphone 120 as shown in FIG. 1. Also included in the input devices 245 can be a voice recognition module 250 adapted for receiving voice or speech spoken by a user, and converting the same into commands executable by the CPU 205. For convenience only, the voice recognition module 250 is shown in connection with the input devices 245. However, this illustration does not limit implementations of the subject matter described herein. For example, the voice recognition module 250 may also be viewed or implemented as part of the software components 225 discussed above.

The CPU 205 can provide output to the user via bus 210(4), which couples the CPU 205 to communicate with various output devices 255. The output devices 255 can include, for example, the display 115 shown in FIG. 1. The display 115 may be suitable, for example, for presenting information to the user via a user interface. As described herein, a "user interface" may be a visual display and/or an audio prompt presented to the user. In response to prompts or other data provided by the user via the user interface, the user may enter data via the keypad 110 or by the microphone 120. The output devices 255 can also include a speaker or earpiece 260, through which the user may also be prompted for information or commands, in addition to enabling the user to engage in voice-based conversations with other users. The speaker 260 can operate, for example, in a speaker-phone mode or in a "private" mode audible to the user by placing the speaker 260 in close proximity to the user' ear.

It is understood that tangible computer- or machine-readable media suitable for storing software executing the processes and/or methods described herein can include at least various portions of the memory module 215. It is further understood that signals representing the software executing the processes taught herein may be propagated (e.g., uploaded, downloaded, or otherwise transferred) via the busses 210, the network interface 235, and/or the network 240.

The device 105 can also include a switch 265 that changes state in response to a user opening or otherwise altering a state of a housing of the device 105 in preparation for using the device 105. For example, the switch 265 may be in one state when the device 105 is in a "closed" position. When the user opens the device 105, or otherwise interacts with the housing, to ready the device 105 for use, the switch 265 may change state in response to this action by the user. For example, in the illustrative embodiment shown in FIG. 1, the device 105 may have a hinged configuration, with the user flipping open the two hinged portions before using the device 105 to place or receive a call. In another example, the device 105 may be opened by the user sliding two portions of the device 105 relative to one another. Other scenarios may be possible. For example, assuming an implementation using a wired device, an on-hook signal, an off-hook signal, or other suitable signal associated with the wired device may also be used to change the state of the switch 265. In other examples, the state of the switch 265 may be changed by pushing a button on the device 105, touching the device 105 or a housing thereof, or the like. In addition, the state of the switch 265 may be changed by voice command.

In any event, the switch 265 can be coupled to the mechanism chosen for a particular implementation of the device 105, such that the state of the switch 265 may indicate the mechanical status of the device 105 (i.e., either open or closed, or transitions therebetween). The switch 265 may be coupled to communicate its state to the CPU 205, such that software executing on the CPU 205 may obtain the mechanical status of the device 105 by sampling or polling the state of the switch 265. Transitions in the state of the switch 265 may serve as a trigger for the processing discussed in detail below.

Figure 3:
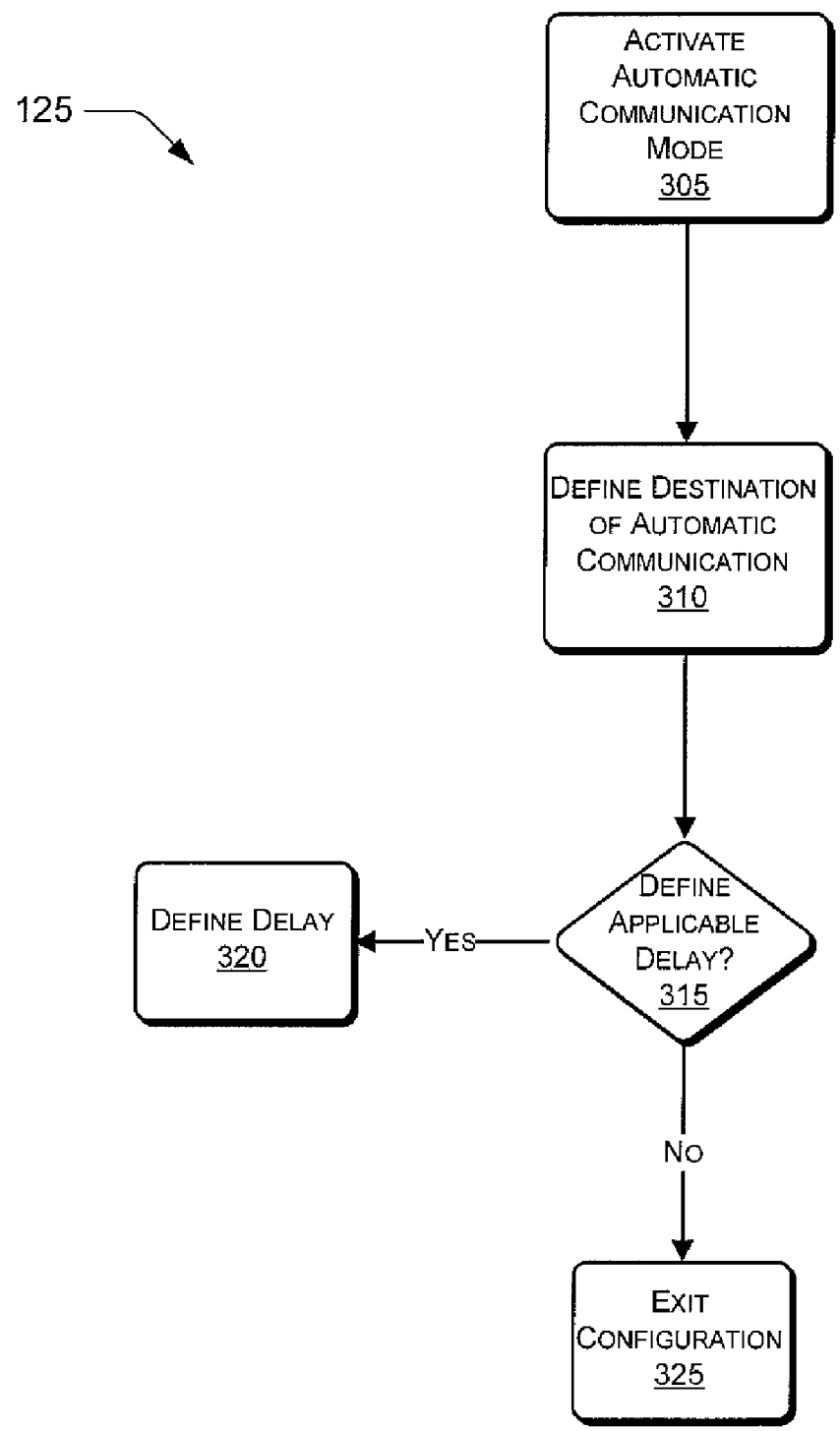
FIG. 3 is a flow diagram illustrating an exemplary process flow suitable for configuring the communications device to automatically initiate a communication to a given destination.

FIG. 3 illustrates an exemplary process flow suitable for configuring the device 105 to automatically initiate a communication to a given destination when the user opens or otherwise accesses the device 105, as represented generally by the process block 125 shown in FIG. 1. In block 305, the process 125 can enable activation of an automatic communication mode of the device 105. For example, the process 125 may present a suitable user interface to a user of the device 105, via for example, the display 115 or the speaker 260. The process 125 can prompt the user to either activate or de-activate the automatic communication mode. Suitable examples of such a user interface are presented and discussed below. The user can respond as appropriate, for example, via the keypad 110, the microphone 120, and/or the voice recognition module 250. In general, any user prompts, user responses, or any other interactions between the user and the device 105 can be enabled or facilitated similarly to the foregoing.

In block 310, the process 125 can enable definition of the destination to which the communication is to be automatically directed when the user opens or otherwise accesses the device 105. In some implementations, the destination may be specified by the user directly. For example, the user may key-in or speak a given telephone number or address book entry that the device 105 is to contact automatically when the user opens the device 105. In other implementations, the destination may be defined automatically by the device 105, based on, for example, past call history or past usage associated with the device 105, or entries in the address book 235 (5).

It is noted that the communication that is initiated automatically can take the form of a telephone call dialed to a destination telephone number. In other implementations, the communication can take the form of initiating a two-way radio communication with the destination. For example, a "push to talk" feature may be initiated to place two devices 105 in "walkie-talkie"-type communication. Other communication modes are possible in other implementations, such as paging, text messaging, or the like.

In block 315, the process 125 enables definition of a delay applicable to the automatic initiation of communications. More particularly, the device 105 may be configured to wait for some predefined interval of time before automatically initiating the communication to the chosen destination. At any point before expiration of this time interval, the user of the device 105 may prevent the automatic communication by taking an action. For example, the user may press a key on the keypad 110, speak a command, or otherwise interact with the device 105 in a predefined manner to stop the communication from being automatically initiated. If the user does not take such action within the defined interval, the communication is automatically initiated.

It is also noted that different time delay intervals may be defined for different destinations. For example, a first given telephone number may be associated with a delay interval of, e.g., five seconds, if that first given telephone number is chosen as the destination for the automatic communication. Another given telephone number may be associated with a different delay interval, and so on. Additionally, some telephone numbers or other destinations may be made ineligible for automatic communications. Other telephone numbers or destinations may be configured with a delay value of zero, such that communications are initiated to these numbers or destinations when the user opens the device 105, without any delay. The latter configuration may be useful when the user communicates regularly with another party for some period of time.

In any event, in block 315, the process 125 enables the user to determine whether to establish a delay value. For example, the process 125 may present to the user a suitable prompt in textual, graphic, or verbal form, asking the user whether he or she wishes to establish delay values for the automatic communications feature. If the user responds affirmatively, the process 125 can proceed to block 320, where one or more delay values are established. If the user responds negatively, the process 125 proceeds to block 325, where the process 125 exits.

Figure 4:
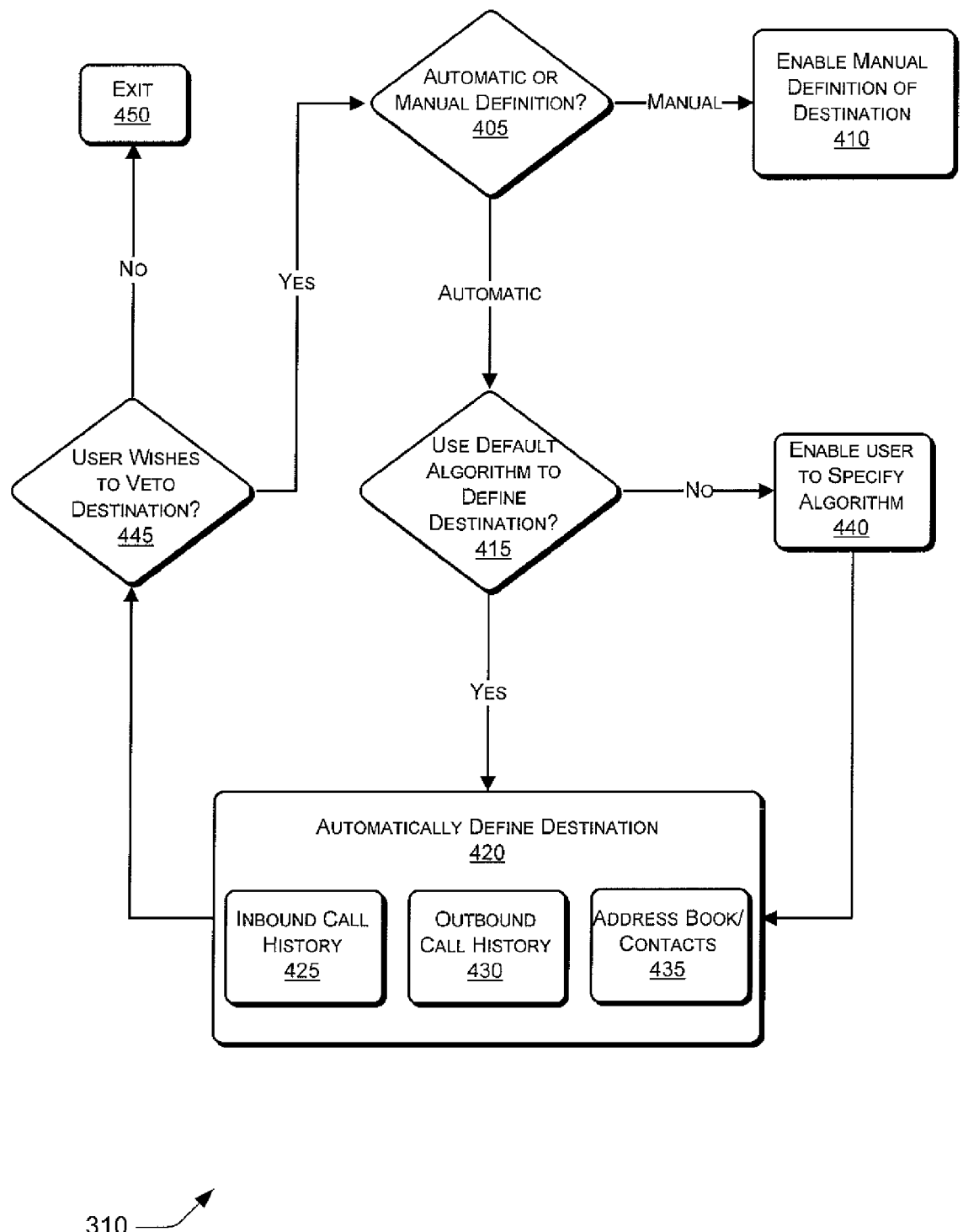
FIG. 4 is a flow diagram illustrating additional exemplary aspects relating to defining the destination, as shown in FIG. 3.

FIG. 4 illustrates additional exemplary aspects of the process block 310 shown in FIG. 3. More particularly, block 310 represents the overall process of specifying or defining the destination to which the automatic communication initiated by the device 105 is directed.

As represented generally in block 405, the process 310 may enable the user to choose to specify the destination manually, or to have the destination chosen automatically. For example, the process 310 may prompt the user to choose automatic or manual mode by keypad, voice command, or other suitable means, with the user responding appropriately.

If the user chooses manual mode, the process 310 proceeds to block 410, where the user provides the destination directly. For example, the process 310 may prompt the user to choose the destination by keypad entry, voice command, or other suitable means, with the user responding appropriately. In any event, block 410 enables the user to manually define the destination to which the automatically-initiated is directed.

If the user chooses automatic mode, the process 310 can proceed to block 415 to determine whether to use a default algorithm or technique to define the destination automatically, or whether to enable the user to select the algorithm or technique used to define the destination. If the default technique is to be used, the process 310 proceeds to block 420.

In block 420, the destination may be defined automatically based on previous call history associated with a given device 105. For example, the process 310 can analyze a history of incoming or inbound communications, as represented generally in block 425. Also, the process 310 can analyze a history of incoming or outgoing or outbound communications, as represented generally in block 430. In other implementations, the destination may be defined automatically by referring to contact lists, address books, or the like as may be associated with the device 105, as represented generally in block 435.

In addition to supporting the manual specification mode represented by block 410, the process 310 can automatically define the destination by analyzing parameters including, but limited to, the following:

a destination from which the most calls arrive to the device 105, a destination to which the device 105 calls most often, a destination from which the last incoming call arrived to the device 105, a destination to which the device 105 called most recently, a first name in an address book or other contact list maintained by the device 105, and/or a destination associated with a last non-completed communication to or from the device 105.

Any of the foregoing approaches may be set as a default to be used in define the destination, either by the device 105 or by the user. Once a default approach is set, by whatever means, this default approach may be used to define the destination.

Returning to block 415, if the user chooses not to use the default approach, the process 310 proceeds to block 440, where the user selects the approach used to define the destination. Afterwards, the process 310 can proceed to block 420 to define the destination using the approach selected by the user.

Once the destination is defined in block 420, the process 310 can proceed to block 445 to give the user an opportunity to veto the destination that was defined automatically in block 420. If the user is dissatisfied with the automatically-defined destination, the process 310 can proceed to block 405, where the user can select automatic or manual definition of the destination. If the user is satisfied with the automatically-defined destination, the process 310 can proceed to block 450 to exit.

It is understood that in the description herein, the term "destination" can refer to a telephone number or any other type of address associated with, for example, text messaging, paging, e-mailing, or the like. More generally, the destination can refer to any quantity stored in the address book 235(5), contact list, or other similar feature supported by the device 105. Accordingly, the term "destination" is a term of explanation, not a term of limitation.

Figure 5:
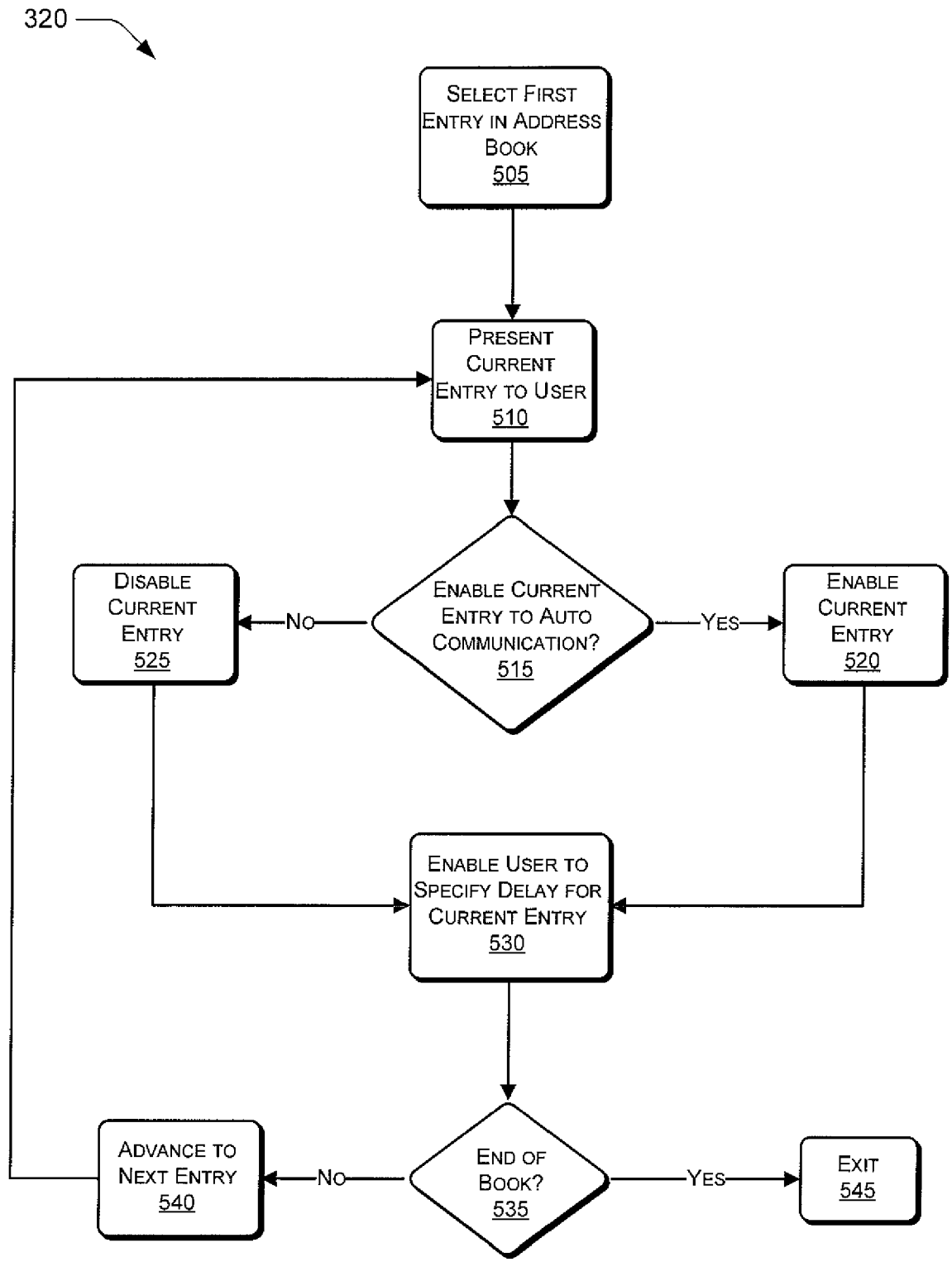
FIG. 5 is a flow diagram illustrating additional exemplary aspects of defining a delay value applicable to automatically initiating the communications as described herein.

FIG. 5 illustrates additional exemplary aspects of the process block 320 shown in FIG. 3. More particularly, block 320 represents the overall process of specifying or defining a delay parameter to be associated with various entries in an address book 235(5), list of contacts, or other similar feature included in or supported by the device 105. For convenience but not limitation, the term "address book" is used herein to refer to such features.

The process 320 can be performed, for example, when the user initially configures the device 105 to perform the capabilities described herein. However, the process 320 may also be performed, at least in part, if and when the user decides to revisit this configuration afterwards. Accordingly, it is understood that each component of the process 320 described below need not be performed each time the overall process 320 is performed. The process 320 may include an "escape" feature that enables the user to jump out from any intermediate point in the process 320, once he/she has completed any desired adjustments to the configuration of the device 105.

In block 505, the process 320 can select a first entry in the address book 235(5) for processing. Assuming, as a non-limiting example, that the entries in the address book 235(5) are arranged or sorted alphabetically, the process 320 in block 505 can select the entry that is "first" alphabetically.

In block 510, the process 320 presents data pertaining to the current entry in the address book 235(5) to the user, for example via the display 115 and/or via the speaker 265. This presented data may include, for example, information sufficient to identify the current entry to the user and to enable the user to consider how he/she wants to handle the current entry through the process described herein. Generally, the process 320 can enable the user to respond by entry through the keypad 110, the microphone 120, and/or the voice recognition module 255.

In block 515, the process 320 can enable the user to enable or disable the current entry in the address book 235(5) for the automatic communication features described herein. For example, assuming the current entry in the address book 235(5) corresponds to someone named "John Smith", the process 320 can prompt the user as follows: "Do you wish to enable or disable automatic communications to John Smith?" The user can then respond as appropriate. If the user wishes to enable the current entry, the process 320 proceeds to block 520 to make an appropriate entry in the address book 235(5). Otherwise, if the user wishes to disable the current entry, the process 320 proceeds to block 525 to make an appropriate entry in the address book 235(5).

It is also noted that the process 320 could enable or disable each entry in the address book 235(5) by default, and leave it to the user to affirmatively act to override this default.

In any event, as shown in block 530, the process 320 can enable the user to associate a delay parameter with the current entry in the address book 235(5). The delay parameter can be any convenient value chosen by the user, typically expressed in units of time or other equivalents. As noted above, the delay can be specified as zero for a given entry in the address book 235(5). Assume that the device 105 is configured using, for example, the techniques described above, to define this given entry as the destination to which the device 105 initiates a communication automatically. If the delay is specified as zero for this given entry, and the given entry is configure as the destination for the device 105, then the device 105 will initiate a communication with the destination when the device 105 is opened, without delay.

It is noted that the process 320 can enable the user to associate a delay value with an entry in the address book 235(5) even though that entry may be disabled from the automatic communication feature. If the entry is disabled, the device 105 may treat the specified delay value as a "don't care" value, or otherwise ignore it. However, if the user subsequently wishes to enables the entry for the automatic communication feature, and has previously set a delay value, then he or she need only go to blocks 515 and 520 to enable the entry. Afterwards, the user can "escape" from the process 320 to avoid any unnecessary or undesired configuration steps. In this case, the user need not proceed all the way to block 530, unless he or she wishes to change the delay value.

Once the delay value is associated with the current entry, the process 320 can proceed to block 535 to test whether it has reached the end of the address book 235(5). If not, the process 320 can proceed to block 540 to advance to the next entry in the address book 235(5), making that entry the current entry. Afterwards, the process 320 can return to block 510.

It is understood that the address book 235(5) can be traversed in any convenient fashion, depending on how the address book 235(5) is organized. For example, if the entries in the address book 235(5) are organized alphabetically, the process 320 can traverse the address book 235(5) alphabetically. As another example, if the address book 235(5) is organized in sequential order without regard to the contents of the entries, the process 320 can traverse the address book 235(5) in this sequential order. Other scenarios may be possible as well, for example, traversing the address book 235(5) in the order in which the entries are created.

Returning to block 535, if the process 320 has reached the end of the address book 235(5), the process 320 can proceed to block 545 to exit. At this point, the device 105 and the address book 235(5) have been configured to initiate communications to the destination automatically in response to, e.g., transitions in the mechanical state of the device 105, as indicated by the switch 265.

Figure 6:
FIG. 6 is a block diagram illustrating example contents of a data structure, such as an address book associated with the communications device, suitable for automatically initiating communications from the communications device.

FIG. 6 illustrates an example of the address book 235(5) as it would stand after the foregoing configuration processes. It is understood that FIG. 6 is presented and discussed herein only to facilitate the instant description of the address book 235(5), and not to limit possible implementations of the address book 235(5). Accordingly, it is understood that the layout, contents, and/or configuration of the address book 235(5) as shown in FIG. 6 may be modified without departing from the scope of the subject matter described herein. Also, it is understood that implementations of the address book 235 (5) may include additional fields beyond those shown in FIG. 6 without departing from the scope and spirit of the subject matter described herein.

The address book 235(5) can include a plurality of entries, each of which may be assigned a row in the representation of the address book 235(5) as shown in FIG. 6. For example only, three entries are shown in FIG. 6, each having a respective row.

Various parameters relating to each entry appear in the several columns of FIG. 6. A column 605 contains a name for each entry referred to generally as names 605. In the example shown in FIG. 6, the entries correspond to persons named "John Smith", "Jane Doe", and "George Bailey". The entries and corresponding names 605 can be, for example, manually created on the device 105 by the user, or imported into the device 105 from an external source.

A column 610 can contain a destination identifier for each entry, referred to generally as destination 610. This destination 610 can be populated by, for example, the process 310 illustrated in FIGS. 3 and 4. The destination 610 can take the forms of, for example, telephone numbers, e-mail addresses, IM identifiers, or the like. In the example shown in FIG. 6, John Smith is associated with a destination 610 in the form of a telephone number, Jane Doe is associated with a destination 610 in the form of an e-mail address, and George Bailey is associated with a destination 610 in the form of a screen name. Other variations of the destination 610 may be possible, but are not shown in FIG. 6 in the interests of clarity and conciseness.

A column 615 can indicate whether given entries in the address book 235(5) are enabled or disabled for the automatic communication feature described herein. For example, the column 615 can contain a flag or Boolean variable in each row, indicating whether the entry corresponding to that row is enabled or disabled for the automatic communication feature. Other implementations are possible as well, such as a character string or the like. The entries in the column 615 may be populated by the process 320 shown in FIGS. 3 and 5. More particularly, the column 615 may be populated as a result of the user's response to blocks 515, 520, and/or 525 in FIG. 5.

A column 620 can indicate the delay value specified for each entry in the address book 235(5) by the user. Recall that the delay value for these entries can be specified by the user using the process 320 shown in FIGS. 3 and 5. More particularly, the column 620 may be populated with the user's response to block 530 in FIG. 5. Illustrative but non-limiting examples of delay values are shown in column 620 for the three entries of the address book 235(5).

A column 625 can indicate which, if any, of the entries of the address book 235(5) have been selected as the destination of communications initiated automatically after the automatic communication feature is activated or enabled. Recall that the automatic communication feature can be enabled or activated in block 305 shown in FIG. 3. Recall also that one of the destinations 610 is chosen as the destination of the communication using, for example, the process 310 shown in FIGS. 3 and 4. The column 625 can indicate which of the destinations 610 is currently the active destination of the automatically-initiated communications. For example, the values in the column 625 can be Boolean values, with all values being "zero" or "no" except for the active destination. However, if the automatic communication feature has not been enabled, or is disabled after being enabled, all values in the column 625 may be "zero" or "no".

Figure 7:
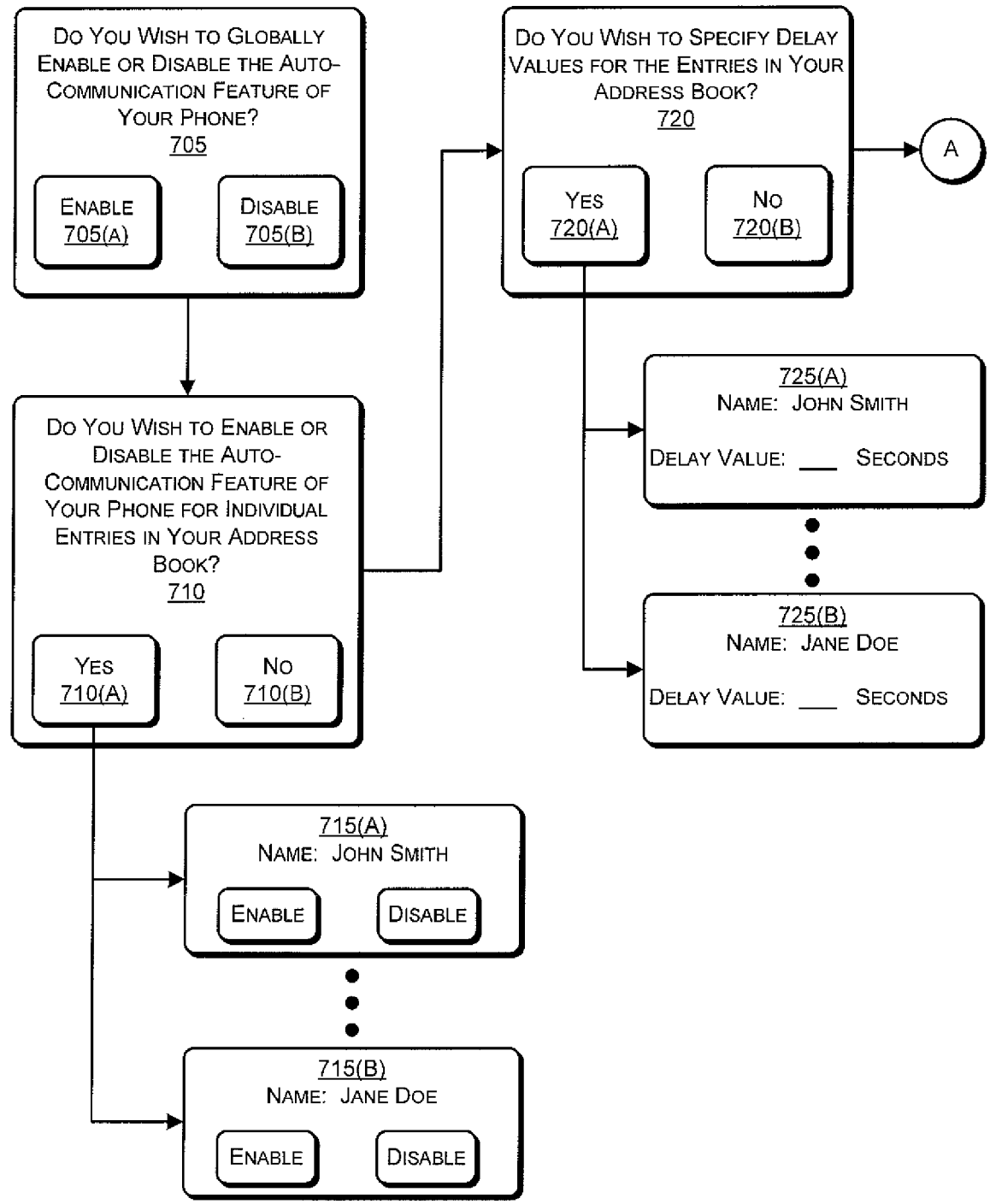
FIGS. 7 and 8 are block diagrams of exemplary illustrative user interfaces that might be presented to a user in connection with configuring the communications device to automatically initiate communications to a recipient.
Figure 8:
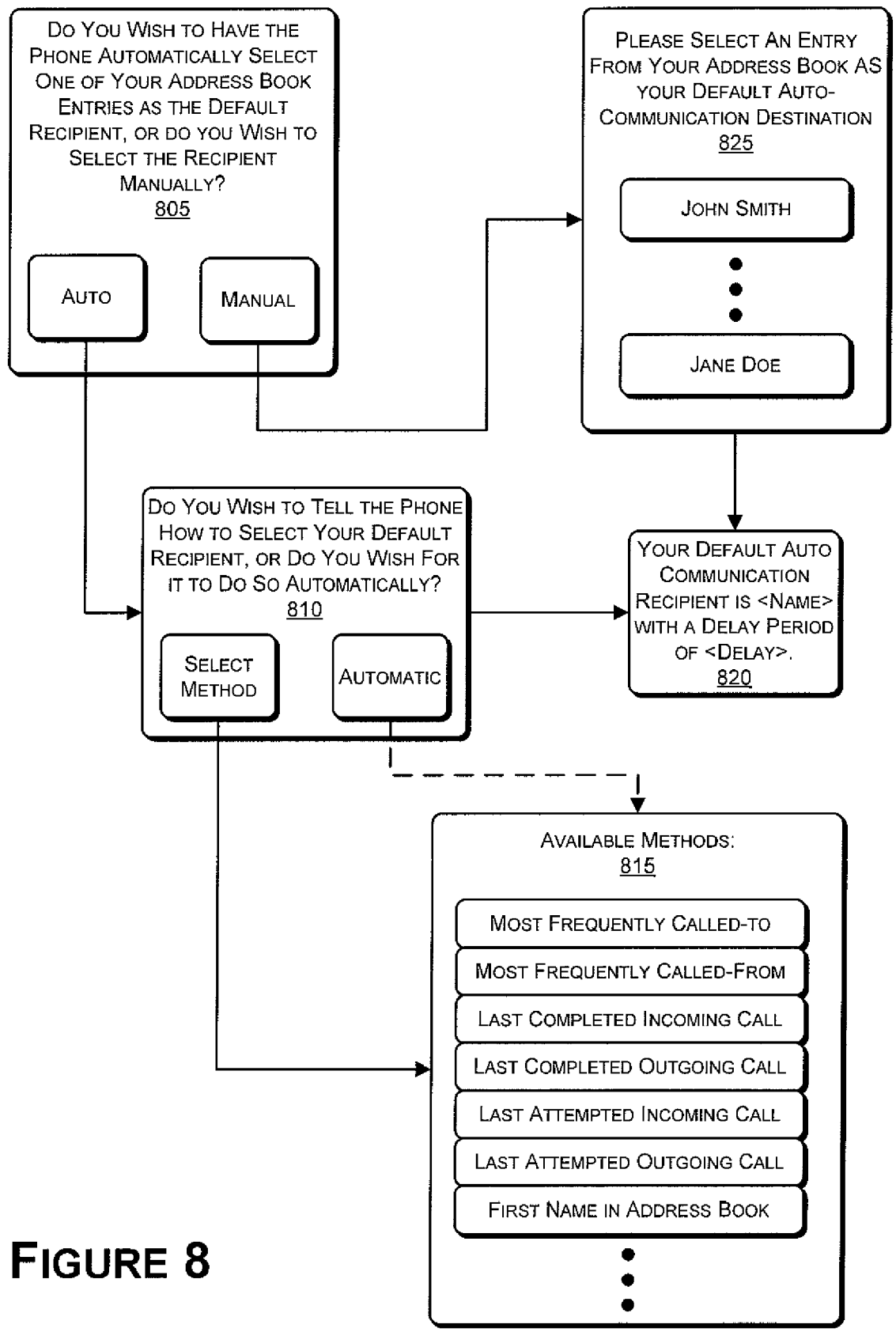

FIGS. 7 and 8 illustrate an illustrative sequence of several exemplary user interfaces that might be presented to a user in connection with configuring the device 105 to automatically initiate communications to a recipient. It is understood that the various user interfaces shown in FIGS. 7 and 8 are presented in an order convenient for discussion herein and not to limit possible implementations of these user interfaces. It is also understood that the various prompts and options shown in these user interfaces are illustrative only and may be altered without departing from the scope and spirit of the subject matter described herein. Finally, it is understood that the user interfaces shown in FIGS. 7 and 8 may be implemented visually, so as to interact with the user through, for example, the display 115 and/or the keypad 110. Alternatively, the user interfaces shown in FIGS. 7 and 8 may be implemented as voice- or speech-enabled interfaces, which may interact with the user through, for example, the speaker 260 and the microphone 120.

Turning to FIGS. 7 and 8 in detail, a user interface 705 can be presented to the user in connection with, for example, the process block 305 shown in FIG. 3. In the user interface 705, the user is prompted whether he or she wishes to globally enable or disable the automatic communication feature of the device 105. Options 705(A) and 705(B), and other options discussed below, may be presented as buttons on a visual graphic user interface (GUI) or as verbal prompts, for example. If the user wishes to disable the automatic communication feature, the entries in column 615 may, for example, all be set to a logical "no" value, disabling the feature for all entries in the address book 235(5) and effectively disabling the feature on the device 105. If the user wishes to enable the feature, the process 125 may proceed to process block 310 et seq. as described above in connection with FIG. 3.

The user interface 710 enables the user to request that individual entries in the address book 235(5) be enabled or disabled. The user interface 710 may be presented in connection with, for example, the process block 305 shown in FIG. 3. The user interface 710 may include options 710(A) and 710(B) that correspond to "Yes" or "No" responses from the user.

If the user wishes to enable or disable individual entries in the address book 235(5), an instance of the user interface 715 may be presented to the user for each entry in the address book 235(5). Two example user interfaces 715(A) and 715(B) are shown in FIG. 7 for two respective entries in the address book 235(5). The user interfaces 715(A) and 715(B) may be pretended one at a time, or all at once, in illustrative implementations. Depending on how the user responds to the user interfaces 715(A) and 715(B), appropriate values may be entered in, for example, the column 615 as shown in FIG. 6.

The user interface 720 may be presented to the user in connection with, for example, the decision block 315 shown in FIG. 3. Options 720(A) and 720(B) are shown, corresponding to "Yes" or "No" responses from the user. If the user does not wish to specify delay values, the user interfaces shown in FIG. 8 may be presented. If the user wishes to associate delay values with entries in the address book 235(5), then user interfaces 725(A) and 725(B) may be presented in connection with, for example, process block 320 shown in FIGS. 3 and 5. The user interfaces 725(A) and 725(B) may be presented one at a time, or all at once, in illustrative implementations. The user may proceed to specify a delay value for various entries in the address book 235(5). In response thereto, the column 620 in FIG. 6, for example, may be populated.

FIGS. 7 and 8 are joined for convenience of illustration, but not limitation by the reference "A". A user interface 805 can be presented to the user in connection with, for example, the process block 405 shown in FIG. 4. Via the user interface 805, the user can select between automatic and manual modes for selecting the recipient or destination of the communications automatically initiated by the device 105 as described herein.

If the user chooses the automatic mode for selecting the recipient or destination of the communications, a user interface 810 may be presented. In the user interface 810, the user may specify the method used by the device 105 in selecting the recipient or destination, or the device 105 itself may select the method used. The user interface 810 may be presented in connection with, for example, the decision block 415 shown in FIG. 4.

If the user chooses to select the method used to determine the recipient or destination, a user interface 815 may be presented. The user interface 815 may be presented in connection with, for example, the decision block 420 shown in FIG. 4. The user interface 815 as shown in FIG. 8 includes a listing of illustrative methods for selecting the recipient or destination of the communications automatically initiated by the device 105.

If the user chooses for the device 105 to automatically select the method used to determine the recipient or destination, the illustrative methods for selecting the recipient or destination of the communications may be employed, even if the actual user interface 815 is not presented to the user. This relationship is represented in FIG. 8 by the dashed line connecting the representations of the user interfaces 810 and 815.

Taken collectively or severally, the various methods shown in the user interface 815 may define a statistical model for analyzing the entries in the address book 235(5). In some sense, the entries in the address book 235(5) may be reordered based on this analysis, such that the "first" alphabetical entry in the address book 235(5) is not necessarily presented first to the user when the user accesses the address book 235(5).

Once the recipient or destination of the communications by whatever means, a message 820 may be presented to the user, indicating the selected recipient or destination to which the communications will be directed and the applicable delay period. When the device 105 automatically initiates a communication to the recipient or destination later on, the device 105 may present message 820, or a variant thereof, on the display 115 to notify the user that a communication is currently being automatically initiated. The message 820 or variant thereof can also indicate the selected recipient or destination and the delay period.

Returning to the user interface 805, if the user wishes manually to select the recipient or destination of the automatically-initiated communication, a user interface 825 may be presented. The user interface 825 may be presented in connection with, for example, the process block 410 shown in FIG. 4. The entries in the address book 235(5) may be presented to the user for selection as the recipient or destination, or the user may key-in, speak, or otherwise indicate a selection as the recipient or destination via the user interface 825.

Once the user has selected the recipient or destination, the message 820 may be presented to the user. Illustrative features of and data presented by the message 820 are described above.

The configuration process 125 described above may also enable or disable the automatic communication capability at particular times of the day, particular days of the week, or the like. Additionally, the configuration process 125 can set different destinations as the default destination at particular times of the day, particular days of the week, or the like. For example, a given user may set his device 105 to automatically initiate communications to a co-worker or colleague during typical business hours, but may set the device 105 to automatically initiate communications to a spouse or other family member outside of typical business hours or on weekends. Alternatively, the user may decide to simply disable the automatic communications feature outside of business hours, or on weekends.

Figure 9:
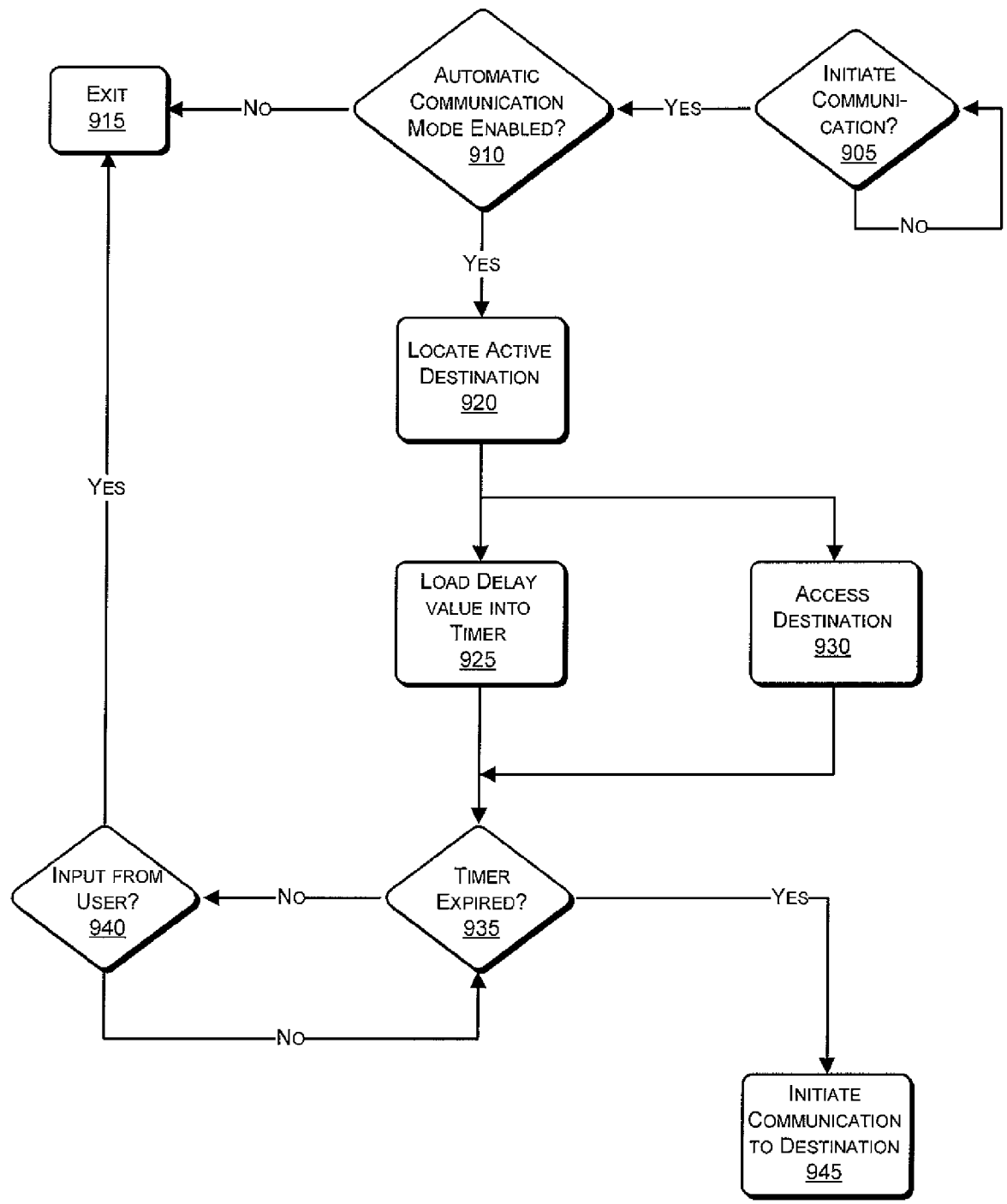
FIG. 9 is a flow diagram illustrating an exemplary process for automatically initiating a communication to a destination from the communications device.

FIG. 9 illustrates an exemplary process flow performed to automatically initiate a communication to a destination when the device 105 is opened or otherwise mechanically altered by the user in preparation for use. The process flow shown in FIG. 9 corresponds to the block 130 shown in FIG. 1, and is referenced herein as process flow 130.

In block 905, the process flow 130 loops until it detects that the user has taken some action to initiate a communication with the device 105. For example, the user may have opened the device 105. For example, as shown in FIG. 2, a switch 265 may transition or otherwise change state when the device 105 is opened. If the process flow 130 is executing on the CPU 205, the process flow 130 can sample the output of the switch 265 and thereby detect when the device 105 has been opened. As another example, the user may have pressed a "call" button on a mobile phone, as marked by, e.g., a green symbol or text or by a telephone receiver icon, without first manually or verbally entering or providing a destination number. In block 905, the process flow 130 can test for any of these occurrences by, for example, sampling buffers associated with the keypad 110 or the microphone 120.

Once the initiation of the communication has been detected, the process flow 130 proceeds to block 910, where it tests whether the automatic communication mode has been enabled for the device 105. For example, the process flow 130 can refer to column 625 in the address book 235(5) or other equivalent data structure, as shown in FIG. 6. Recall that column 625 can contain values indicating whether any entries are selected as active entries for the automatic communication feature. If none of the entries in column 625 tests "true" or "yes", then the automatic communication feature is disabled. Otherwise, if at least one of the entries in column 625 tests "true" or "yes", then the automatic communication feature is enabled.

From block 910, if the automatic communication feature is not enabled, then the process flow 130 proceeds to block 915, which can represent an exit state for the process flow 130. In this event, the device 105 may revert to handling an outgoing communication or other user operation without employing the automatic communication mode or feature. However, if from block 910, the automatic communication feature is enabled, the process flow 130 proceeds to block 920 to locate the destination that was designated or selected as active by the user when configuring the device 105 for the automatic communication mode. Block 920 can locate the active destination, for example, by traversing the column 625 in FIG. 6 and identifying the entry having a "true" or "yes" value in this column.

As an example of the foregoing, referring briefly to FIG. 6, the row for "George Bailey" has a "yes" value in column 625. This indicates that the automatic communication mode is enabled, and also that the device 105 is to automatically initiate a communication to the destination 610 for "George Bailey" when the device is opened. The process flow 130 can then traverse the row for "George Bailey" to extract any pertinent data therefrom.

Returning to FIG. 9, in block 925, the process flow 130 can load the delay value 620 from the row having a "yes" value in column 625. In the preceding example, the process flow 130 would load a delay value 620 of 0 seconds from the "George Bailey" row. This would indicate that the device 105 will delay 0 seconds before initiating the communication automatically. As noted above, other delay values are possible, as shown in column 620 of FIG. 6.

The delay value 620 can be loaded into, for example, a timer. As described further below, the timer measures the time interval over which the user may act to prevent the device 105 from automatically initiating a communication with the specified destination.

In block 930, the destination 610 from the row having a "yes" value in column 625 can be accessed. Returning to the example above, the destination 610 for the "George Bailey" row is the user name "GeorgeB". Accordingly, the process flow 130 can cause the device 105 to automatically initiate a communication to the user name "GeorgeB", which might be, for example, a screen name for an Instant Messaging or chat application accessible through the device 105. The destination 610 can also take the forms of phone numbers, e-mail addresses, or the like, as illustrated in FIG. 6.

Blocks 925 and 930 are shown proceeding in parallel for convenience only. The process flow 130 may be implemented with the blocks 925 and 930 proceeding in series or any other convenient relationship.

Once the timer is loaded with the delay value 620, the process flow 130 proceeds to block 935, where the process flow 130 tests whether the timer has expired. If the timer has not yet expired, the process flow 130 proceeds to block 940, where the process flow 130 tests whether the user has provided any input. For example, the user might provide input via the keypad 110 or the microphone 120. If the process flow 130 is executing on, for example, the CPU 205, the process flow 130 can sample buffers associated with the keypad 110 or the microphone 120 to determine if the user has provided any input.

From block 940, if the user has not provided input, the process flow 130 returns to block 935 to test whether the timer has expired. If the timer has expired, the process flow 130 proceeds to block 945 to automatically initiate a communication to the destination 610 accessed in block 930.

Returning to block 940, if the user does provide input, the process flow 130 proceeds to the exit state 915. From the exit state 915, the device 105 can respond to further user input without using the automatic communication capability discussed herein. In short, the process flow 130 can loop between decision blocks 935 and 940 until the earlier of:

1) the timer expires, in which case the communication is automatically initiated to the active destination 610; or
2) the user provides input, in which case the process flow 130 exits.

Figure 10:
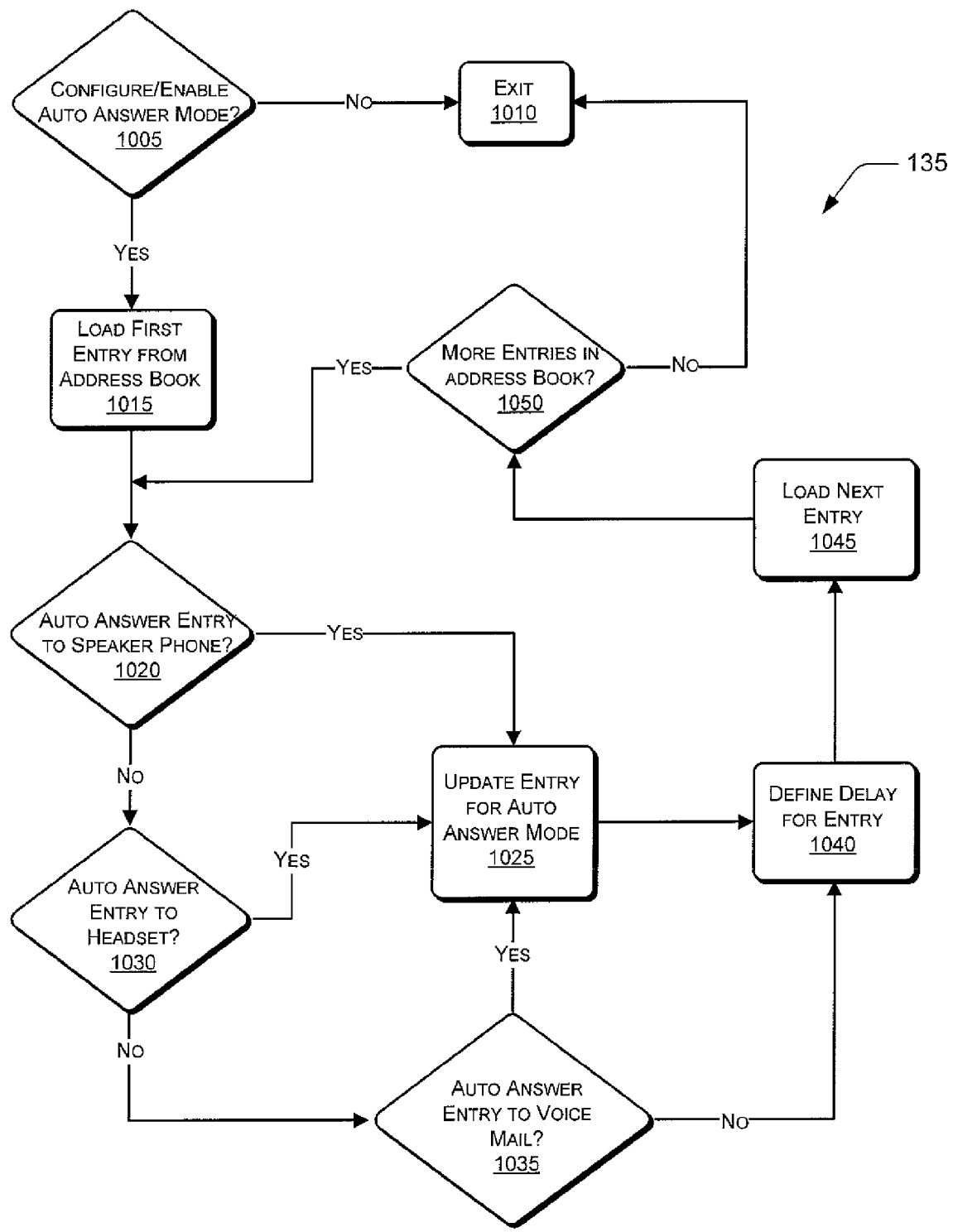
FIG. 10 is a flow diagram illustrating an exemplary process for configuring the communications device to automatically receive incoming communications.

FIG. 10 illustrates an exemplary process flow 135 for configuring the device 105 to automatically receive incoming communications. It is understood that a given device may be configured in accordance with one or both of the process flows 125 and 135. Put differently, the device 105 may be configured to automatically initiate outgoing communications upon opening. In addition to or instead of the foregoing, the device 105 may also be configured to automatically answer and route incoming communications.

In block 1005, the process flow 135 can enable the user to choose to configure or enable the device 105 to perform automatically answer incoming communications. If the user responds negatively, the process flow 135 can proceed to an exit state 1010. If the user responds affirmatively in block 1005, the process flow 135 can proceed to block 1015 to load the first entry from, for example, a data structure such as the address book 235(5) shown in FIG. 6.

It is understood that the address book 235(5) as shown in FIG. 6 can be further augmented to contain the data referenced in connection with the process flow 135. Alternatively, the data referenced here in process flow 135 can be stored in a separate data structure different from the data shown in FIG. 6.

In block 1020, the process flow 135 can prompt the user to specify whether he/she wishes to automatically answer an incoming communication to the device 105 using a speakerphone mode supported by the device 105. If the user responds affirmatively, the process flow 135 can proceed to block 1025 to update the current entry in the address book 235(5) to indicate that any incoming communications corresponding to this entry are to be routed to the speakerphone of the device 105.

From block 1020, if the user responds negatively, the process flow can proceed to block 1030, where the process flow 135 can prompt the user to specify whether he/she wishes to automatically answer an incoming communication to the device 105 using a headset mode supported by the device 105. If the user responds affirmatively, the process flow 135 can proceed to block 1025 to update the current entry in the address book 235(5) to indicate that any incoming communications corresponding to this entry are to be routed to the headset of the device 105.

From block 1030, if the user responds negatively, the process flow can proceed to block 1035, where the process flow 135 can prompt the user to specify whether he/she wishes to automatically answer an incoming communication to the device 105 by sending the communication to voicemail. If the user responds affirmatively, the process flow 135 can proceed to block 1025 to update the current entry in the address book 235(5) to indicate that any incoming communications corresponding to this entry are to be routed to voicemail.

It is understood that the "Yes" branches from blocks 1020, 1030, and 1035 are shown proceeding to block 1025 only to promote conciseness in FIG. 10, and not to limit possible implementations of the subject matter described herein. Generally, block 1025 represents updating the data structure (e.g., the address book 235(5)) with data specifying an answering mode for incoming calls corresponding to the current entry in the data structure. The actual data loaded into the data structure after each of the blocks 1020, 1030, and 1035 may be different from one another, as discussed in further detail below. The answering modes specified in one of blocks 1020, 1030, and 1035 define a default handling of incoming communications from respective entries in the address book 235 (5).

From block 1035, if the user responds negatively, the process flow can proceed to block 1040, where the process flow 135 can enable the user to specify a delay value that will be applicable to incoming communications from the current entry in the address book 235(5). The process flow 135 can also reach block 840 after updating the automatic answering mode in block 1025.

The delay value specified by the user in block 1040 can indicate how long the user would have to act in order to override the default auto-answering mode established in blocks 1020, 1030, and 1035. The description provided above in connection with the delay 620, as shown in FIG. 6, can apply equally to the delay discussed here in connection with the process flow 135. When an incoming communication arrives at the device 105, the user can override the default automatic handling mode by, for example, opening the device

105, pressing the keypad 110, or speaking a command into the microphone 120 before the delay period defined in block 1040 expires.

In block 1045, the next entry in the data structure, such as the address book 235(5), is loaded. In block 1050, the process flow 135 tests whether it has reached the end of the address book 235(5). If not, the process flow 135 returns to block 1020 to enable the user to specify the automatic answering mode applicable to this new entry in the address book 235(5).

From block 1050, if the process flow 135 has reached the end of the address book 235(5), it can proceed to block 1010 to exit. At this point, the address book 235(5) has been configured to automatically answer incoming communications to the device 105.

FIG. 11 illustrates an exemplary data structure, such as the address book 235(5), and illustrative data contained therein for automatically answering incoming communications to the device 105. As above with the data structure shown in FIG. 6, FIG. 11 is understood as illustrative and non-limiting. It is particularly understood that while the address book 235(5) is referenced in FIG. 11, the data structure in FIG. 11 could be implemented separately from any address book, contact list, or other feature associated with the device 105.

Turning to FIG. 11 in detail, the column 605 is carried forward from FIG. 6 to serve as an illustrative means for distinguishing the entries in the address book 235(5) from one another. However, the address book 235(5) could use any other suitable key or index field to distinguish the respective entries, such as, for example, the destination column 610 shown in FIG. 6.

A column 1110 can indicate whether the user has configured incoming communications from the given entries to be automatically answered using a speakerphone mode of the device 105. The values in column 1110 can be, for example, Boolean values, text strings, or other equivalents. Referring back to FIG. 10, the entries in column 1110 can be populated during block 1025 as a result of the user's response to block 1020.

A column 1115 can indicate whether the user has configured incoming communications from the given entries to be automatically answered using a headset mode of the device 105. The values in column 1115 can be, for example, Boolean values, text strings, or other equivalents. Referring back to FIG. 10, the entries in column 1115 can be populated during block 1025 as a result of the user's response to block 1030.

A column 1120 can indicate whether the user has configured incoming communications from the given entries to be automatically answered to voice mail. The values in column 1120 can be, for example, Boolean values, text strings, or other equivalents. Referring back to FIG. 10, the entries in column 1120 can be populated during block 1025 as a result of the user's response to block 1035.

In the non-limiting example shown in FIG. 11, the entry in the address book 235(5) corresponding to "John Smith" is configured to be auto-answered to speakerphone by default, since column 1110 contains "yes", and columns 1115 and 1120 contain "no". The entry in the address book 235(5) corresponding to "Jane Doe" is configured to be auto-answered to the headset by default, since column 1115 contains "yes", and columns 1110 and 1120 contain "no". Finally, the entry in the address book 235(5) corresponding to "George Bailey" is configured to be auto-answered to voicemail by default, since column 1120 contains "yes", and columns 1110 and 1115 contain "no".

A column 1125 contains a delay value specified by the user for each entry in the address book 235(5). It is understood that the delay value contained in the column 1125 may or may not be the same delay value contained in the column 620 of FIG. 6. In other words, for a given entry in the address book 235(5), the delay period applicable to automatically initiating a communication from the device 105 may or may not be the same delay period applicable to automatically answering a communication to the device 105. In any event, the entries in the column 1125 may be populated during block 1040 shown in FIG. 10.

In the non-limiting example shown in FIG. 11, the entry in the address book 235(5) corresponding to "John Smith" is configured to have a delay of 5 seconds. Recall that the default handling for "John Smith" is to answer to speakerphone, unless the user of the device 105 acts to override this default. Thus, if a communication arrives from "John Smith" to the device 105, the user would have up to 5 seconds to, for example, open the device 105, speak into the device 105, press the keypad 110, or the like. Otherwise, the communication from "John Smith" will be automatically answered in speakerphone mode.

Turning to the entry in the address book 235(5) for "Jane Doe", a delay value of 8 seconds is specified. Recall that the default handling for "Jane Doe" is automatically answering to the headset. Thus, the user would have up to 8 seconds to override the default handling for any communications incoming from "Jane Doe".

Finally, turning to the entry in the address book 235(5) for "George Bailey", a delay value of 0 seconds is specified. Recall that "George Bailey" is configured to be auto-answered to voicemail. Because the user has specified a delay value of 0 seconds, any incoming communications from "George Bailey" will be answered substantially immediately to voice mail. It is understood that all entries configured for voicemail mode need not have a delay value of 0 seconds.

Figure 12:
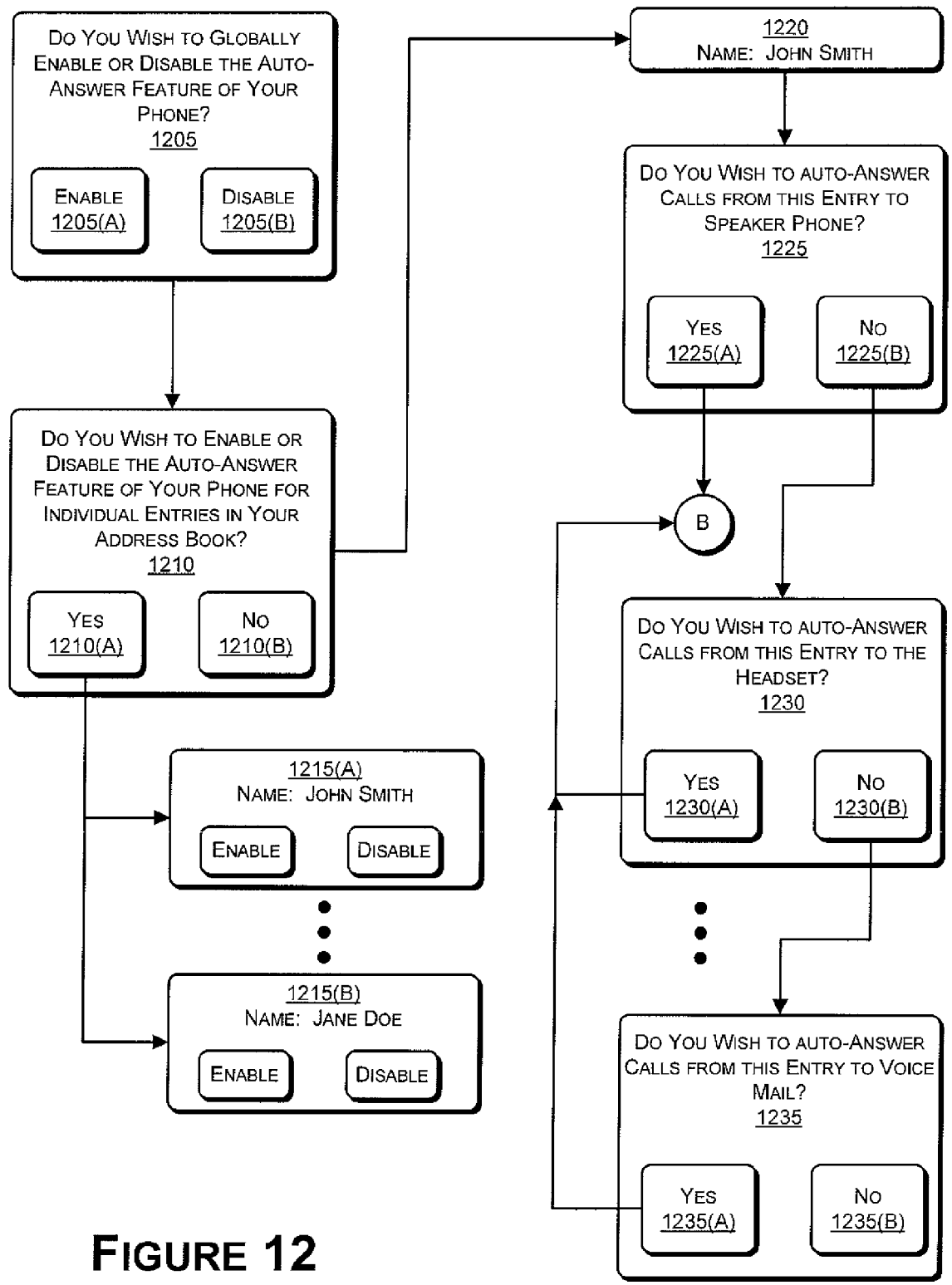
FIGS. 12 and 13 are block diagrams of exemplary illustrative user interfaces that might be presented to a user in connection with configuring the communications device to automatically receive communications.
Figure 13:
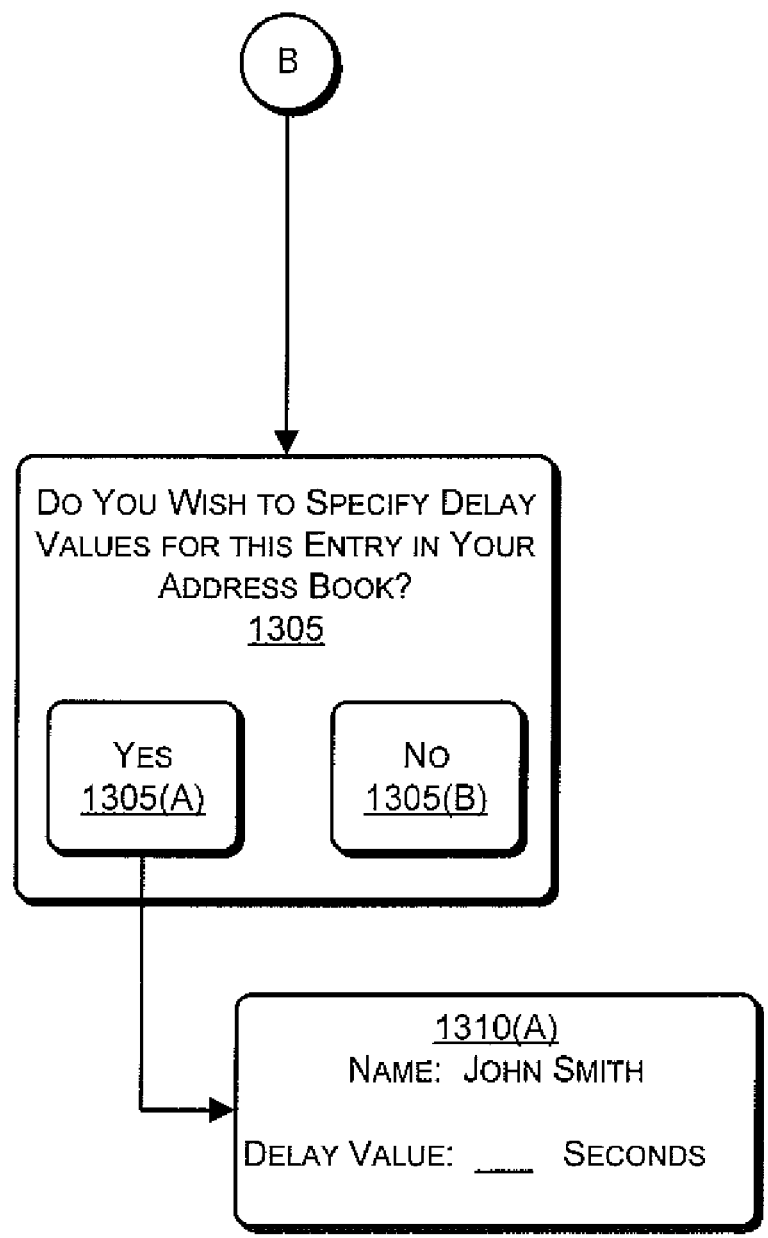

FIGS. 12 and 13 illustrate an exemplary sequence of several user interfaces that might be presented to a user in connection with configuring the device 105 to automatically receive communications from a recipient. The above comments directed above to the user interfaces shown in FIGS. 7 and 8 apply equally to the user interfaces shown in FIGS. 12 and 13.

Turning to the user interfaces shown in FIG. 12 in more detail, a user interface 1205 may be presented to the user in connection with, for example, the process block 910 as shown in FIG. 9. The user interface 1205 may enable the user to globally enable or disable the auto-answer feature on the device 105. Respective "Enable" and "Disable" buttons for the user interface 1205 are shown as references 1205(A) and 1205(B).

A user interface 1210 may also be presented to the user in connection with, for example, the process block 910 as shown in FIG. 9. The user interface 1210 enable the user to traverse the address book 235(5) and enable or disable the auto-answer feature on a per-entry basis, for each entry in the address book 235(5). Representative entries from the address book 235(5) are shown in FIG. 12 as references 1215(A) and 1215(B), corresponding to the entries shown in FIGS. 6 and 9 for John Smith and Jane Doe.

A user interface 1220 can be presented to the user to facilitate traversal of the address book 235(5) in connection with configuring each entry in the address book 235(5) for the auto-answer feature. For example, the user interface 1220 can list the name or other appropriate parameter from each entry in the address book 235(5) as the auto-answer feature is configured. These entries can, for example, be presented to the user one-at-a-time.

A user interface 1225 can be presented to the user in connection with, for example, the decision block 1020 shown in FIG. 10. The user interface 1225 can enable the user to specify whether he/she wishes to have calls from the current entry in the address book 235(5) automatically answered using a speakerphone mode of the device 105. Representative "Yes" and "No" buttons 1225(A) and 1225(B) can be provided as shown in FIG. 12.

If the user wishes to enable speakerphone mode for the current entry in the address book 235(5), the user may respond "Yes" to the user interface 1225. In this event, another user interface may be presented to enable the user to set a delay value associated with the current entry, as illustrated and described in detail below in FIG. 13. For convenience of illustration only, FIGS. 12 and 13 are connected by the reference B.

From the user interface 1225, if the user does not wish to enable speakerphone mode for the current entry, the user may respond "No". In this event, a user interface 1230 may be presented in connection with, for example, the decision block 1030 shown in FIG. 10. The user interface 1230 can enable the user to specify whether he/she wishes to have calls from the current entry in the address book 235(5) automatically answered using a headset mode of the device 105. Representative "Yes" and "No" buttons 1230(A) and 1230(B) can be provided as shown in FIG. 12.

If the user wishes to enable speakerphone mode for the current entry in the address book 235(5), the user may respond "Yes" to the user interface 1230. In this event, the user interface for setting a delay value for the current entry may be presented, as illustrated and described in detail below in FIG. 13, reached via the reference B.

From the user interface 1230, if the user does not wish to enable speakerphone mode for the current entry, the user may respond "No". In this event, a user interface 1235 may be presented in connection with, for example, the decision block 1035 shown in FIG. 10. The user interface 1235 can enable the user to specify whether he/she wishes to have calls from the current entry in the address book 235(5) automatically answered to voicemail. Representative "Yes" and "No" buttons 1235(A) and 1235(B) can be provided as shown in FIG. 12.

If the user wishes to enable speakerphone mode for the current entry in the address book 235(5), the user may respond "Yes" to the user interface 1235. In this event, the user interface for setting a delay value for the current entry may be presented, as illustrated and described in detail below in FIG. 13, reached via the reference B. Additionally, if the user does not wish to enable speakerphone mode, the user interface shown in FIG. 13 may be presented nevertheless, to enable the user to set the delay value in case he or she wishes to enable one of the auto-answer modes later on.

As a result of the user's interactions with the user interfaces 1225, 1230, and 1235, the columns 1110, 1115, and 1120 as shown in, for example, FIG. 11 may be populated. It is also noted that the three auto-answer modes corresponding to the user interfaces 1225, 1230, and 1235 as shown in FIG. 12 are illustrative only, and do not limit possible implementations of the subject matter described herein. Additionally, the order in which the auto-answer modes are presented in FIG. 12 is illustrative only and presented only for convenience. Implementations of the foregoing could readily present these user interfaces 1225, 1230, and 1235, or their equivalents, in other orders.

FIG. 13 continues the sequence of user interfaces from FIG. 12, and is connected to FIG. 12 for convenience by the reference B. As shown in FIG. 13, a user interface 1305 can be presented in connection with, for example, the process block 1040 shown in FIG. 10. The user interface 1305 can enable the user to set a delay value for each entry in the address book 235(5). Representative "Yes" and "No" buttons 1305(A) and 1305(B) can be provided as shown in FIG. 13.

If the user wishes to set a delay value for the current entry in the address book 235(5), the user may respond "Yes" to the user interface 1305. In this event, another user interface 1310 (A) may be presented to enable the user to enter the desired delay value. As shown in FIG. 13, an entry for John Smith is presented for illustration. As a result of the user's interactions with the user interface 1305 for the entries in the address book 235(5), the column 1125 as shown in FIG. 11, for example, may be populated.

If the user responds "No" to, for example, the user interfaces 1235 and/or 1305, next entry in the address book 235(5) can be made the "current" entry for processing purposes, as represented in blocks 1045 and 1050 in FIG. 10.

Figure 14:
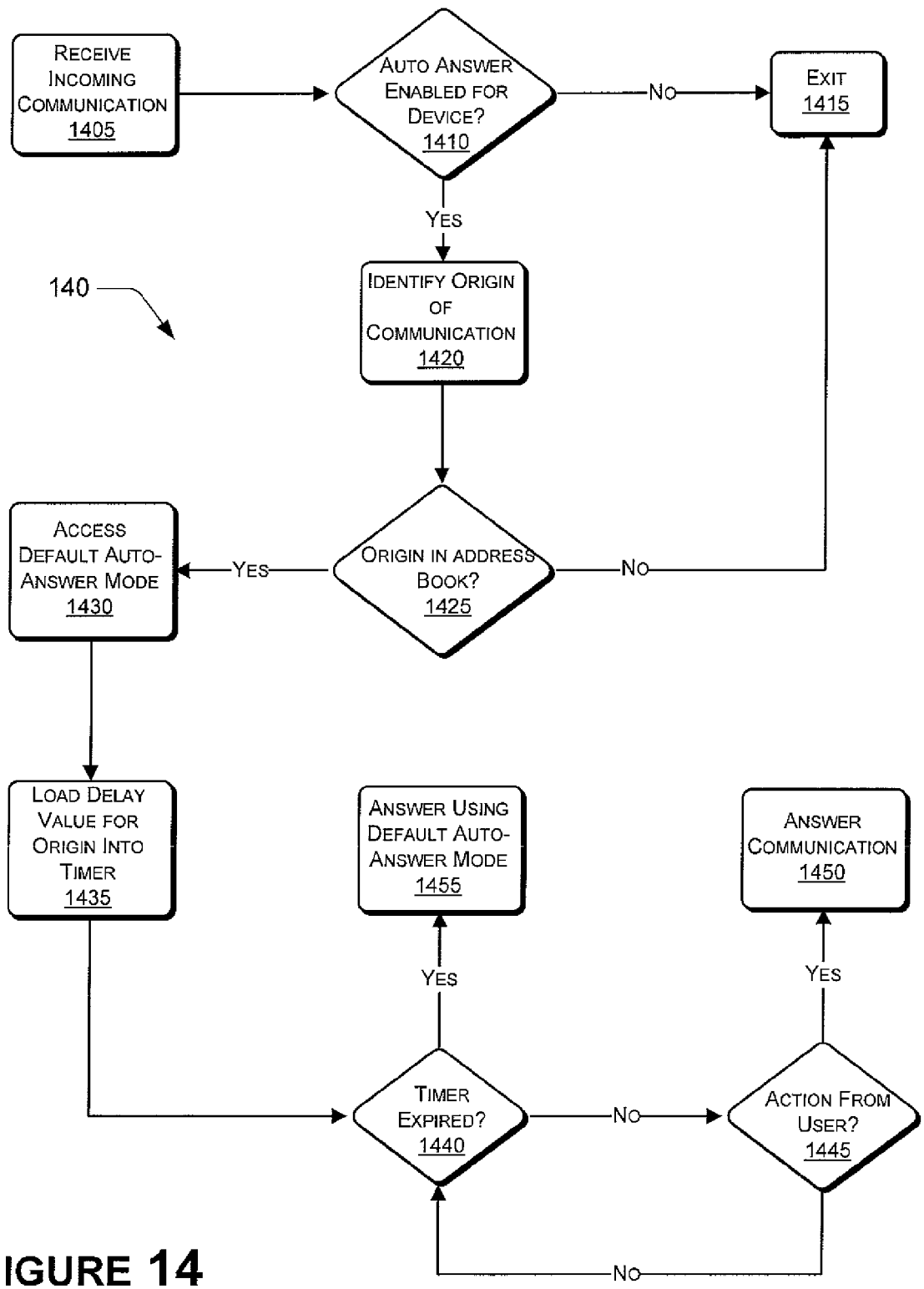
FIG. 14 is a flow diagram illustrating an exemplary process for automatically receiving communications using the communications device.

FIG. 14 illustrates an exemplary process flow 140 for automatically receiving communications using the device 105. The device 105 may be configured for automatically receiving communications using, for example, the process flow 135 shown in FIG. 1 and discussed in more detail in connection with FIG. 10.

In block 1405, the process flow 140 receives the incoming communication at the device 105 from, for example, the wireless network 240 shown in FIG. 2. In block 1410, the process flow 140 tests whether the device 105 has been configured or enabled to automatically answer incoming communications according to the description herein. If not, the process flow 140 can proceed to an exit state 1415.

From block 1410, if the device 105 has been configured or enabled to automatically answer incoming communications, the process flow 140 can proceed to block 1420 to identify the origin of the incoming communication. If the incoming communication is, for example, a telephone call, block 1420 can identify the caller.

In block 1425, the process flow 140 can test whether the origin is contained in a data structure, such as the address book 235(5), for example. The origin may be identified by name, originating telephone number, or any other parameter suitable to uniquely distinguish the origin. More particularly, the origin can be identified sufficiently to enable a search in, e.g., the address book 235(5) for an entry corresponding to the origin.

If the address book 235(5) contains an entry for the origin, the process flow 140 can proceed to block 1430. If the address book 235(5) does not contain an entry for the origin, the process flow 140 can proceed to the exit state 1415.

In block 1430, the process flow 140 can access the default auto-answer mode for the origin, as specified, for example, in the columns 1110, 1115, and/or 1120 of the address book 235(5) as shown in FIG. 11.

In block 1435, the process flow 140 can load into a timer a delay value that is applicable to the origin. The delay value may be specified in, for example, the column 1125 of the address book 235(5) as shown in FIG. 11.

It is noted that the processing represented in blocks 1430 and 1435 may proceed in any relationship to one another. FIG. 14 shows blocks 1430 and 1435 as proceeding in series only for convenience of illustration. However, blocks 1430 and 1435 could be implemented in parallel as well.

In any event, the process flow 140 can proceed to block 1440 to test whether the timer has expired. If not, the process flow 140 can proceed to block 1445 to test whether the user has taken any action on the device 105 to override the default handling for communications incoming from the origin, as specified, for example, in the address book 235(5) as shown in FIG. 11. The user may act to override, for example, by opening the device 105, pressing the keypad 110, and/or speaking into the microphone 120. Assuming that the process flow 140 is implemented to run on the CPU 205, the process flow 140 can detect user action by sampling the switch 265 or buffers associated with the keypad 110 and/or the microphone 120.

From block 1445, if the user takes some action to override the default handling, the process flow 140 can proceed to block 1450. In block 1450, the incoming communication is handled as indicated by any command or actions taken by the user. However, from block 1445, if the user has not taken any action, the process flow 140 returns to block 1440 to test again whether the timer has expired, thereby indicating the elapse of the delay period 1125 shown in FIG. 11.

From block 1440, if the timer has elapsed, the process flow 140 can proceed to block 1455 to answer the call using the default handling specified for the origin in, for example, the address book 235(5). Otherwise, if the timer has not elapsed, the process flow 140 loops to block 1445. In short, the process flow 140 can loop between decision blocks 1440 and 1445 until the earlier of:

1) the timer expires, in which case the incoming communication is automatically answered using the default handling; or
2) the user provides some input, in which case the process flow 140 answers the incoming communication as indicated by the user.

It is understood that the various flow diagrams discussed herein are provided to facilitate the foregoing discussion, and not to limit possible implementing of the teachings herein. More particularly, while the process steps illustrated herein are presented in an order of convenience, these process stops may be performed in different orders without departing from the scope and spirit of the description and claims herein. Additionally, while the processes illustrated herein are discussed in the context of particular architectures, devices, and data structures, it is understood that these processes could be implemented in the context of other architectures, devices, and data structures without departing from the scope and spirit of the description and claims herein.

What is claimed is:

1. A method comprising:
    enabling a communication device to automatically initiate a communication to a default destination in response to a user action relative to the communication device; and
    enabling a determination of the default destination for the automatically-initiated communication, wherein the default destination is configured to change based on a schedule;
    wherein the determination of the default destination comprises analyzing:
        a destination from which most calls arrive at the communication device;
        a destination from which the last incoming call arrived;
        a destination to which the communication device called most recently;
        a first entry in an address book; and
        a destination of a last non-completed communication; and
    wherein the schedule changes the default destination based on a day of the week.

2. The method of claim 1, wherein enabling a communication device to automatically initiate a communication includes enabling the user to selectively enable or disable an automatic communication mode of the communication device.

3. The method of claim 1, wherein enabling a communication device to automatically initiate a communication includes enabling the user to activate a flip-to-communicate mode or a slide-to communication mode of the communication device.

4. The method of claim 1, wherein enabling a communication device to automatically initiate a communication includes enabling the communication device to automatically initiate a push-to-talk communication to a destination.

5. The method of claim 1, wherein enabling a determination of the default destination includes enabling the user to specify an algorithm for determining the default destination to which the automatically-initiated communication is to be directed.

6. The method of claim 1, wherein enabling a determination of the default destination includes automatically specifying the default destination to which the automatically-initiated communication is to be directed by analyzing:
    a destination to which the communication device calls most.

7. The method of claim 6, wherein automatically specifying a default destination includes automatically determining the default destination based at least in part on call history associated with the device.

8. The method of claim 6, wherein the schedule changes the default destination based on: a particular time of the day; and wherein the default destination automatically changes.

9. The method of claim 1, further comprising enabling the user to specify a delay value applicable to the automatic initiation of the communication;
    wherein the user specifies a duration for the delay value.

10. The method of claim 1, further comprising enabling the user to respectively associate delay parameters with entries in an address book associated with the device.

* * * * *